United States Patent [19]

Rosenberg

[11] Patent Number: 5,695,118

[45] Date of Patent: Dec. 9, 1997

[54] FLUID CONTROL SYSTEM

[75] Inventor: Jan Rosenberg, Höllviken, Sweden

[73] Assignee: Roth Scandinavia AB, Malmo, Sweden

[21] Appl. No.: 313,308

[22] PCT Filed: Apr. 5, 1993

[86] PCT No.: PCT/SE93/00288

§ 371 Date: Oct. 5, 1994

§ 102(e) Date: Oct. 5, 1994

[87] PCT Pub. No.: WO93/20387

PCT Pub. Date: Oct. 14, 1993

[30] Foreign Application Priority Data

Apr. 6, 1992 [SE] Sweden .................. 9201078
Oct. 13, 1992 [SE] Sweden .................. 9203020

[51] Int. Cl.[6] .................................................. F24F 3/00
[52] U.S. Cl. ............................................ 237/8 R; 237/63
[58] Field of Search ........................... 237/8 R, 8 C, 237/56, 63; 236/12.21, 12.22

[56] References Cited

U.S. PATENT DOCUMENTS

| | | | |
|---|---|---|---|
| 3,282,295 | 11/1966 | Skriletz et al. | 137/625.17 |
| 3,897,903 | 8/1975 | Race | 237/8 R |
| 4,679,729 | 7/1987 | Petitjean et al. | 237/8 R |
| 4,708,287 | 11/1987 | De Wit | 237/8 R |
| 4,907,739 | 3/1990 | Drake | 237/8 C |
| 5,119,988 | 6/1992 | Fiedrich | 237/8 C |

FOREIGN PATENT DOCUMENTS

| | | |
|---|---|---|
| 1550400 | 9/1969 | Germany. |
| 2621904 | 1/1978 | Germany. |
| 3203964 | 10/1985 | Germany. |
| 66449 | 7/1943 | Norway. |

*Primary Examiner*—William E. Tapolcai
*Attorney, Agent, or Firm*—Ladas & Parry

[57] ABSTRACT

A method of operating a fluid control system and a distribution valve thereto. The fluid control system comprises a heat source (1) for a heat medium and several distribution valves (6) for distribution of heat medium to several heat consumers (8). Cold return heat medium from each heat consumer is returned to the heat source via a pump (10). To each distribution valve is transmitted warm heat medium from the heat source and cold return heat medium, which are mixed in the distribution valve in accordance with the heat requirement of the corresponding heat consumer. The fluid flow to each heat consumer is constant and is adjusted at the installation of the fluid control system. Thence, the fluid flow is maintained constant and the mixture ratio is adjusted independent of the fluid flow. This means that the fluid flow pump will work under constant flow leading to constant pressure over the pump. A distribution valve is provided having the mixture ratio between input cold and warm fluid adjustable and the flow through the valve adjustable independent of each other. (FIG. 1)

3 Claims, 8 Drawing Sheets

FLUID CONTROL SYSTEM

AREA OF INVENTION

The present invention relates to a fluid control system for distribution of a heat medium to several parallel heat consumers.

PRIOR ART

A floor heating system is often used instead of a radiator heating system in heating domestic houses and industrial buildings etc.

In previous radiator systems, such radiators are often placed at the wall below each windows. In a floor heating systems such radiators are replaced by heating hoses or tubes positioned in the floor. Such a floor heating system is often regarded as more comfortable because it locates the heat where it is needed, at the lower part of the rooms. Moreover, a floor heating system is inherently a low temperature system, which lends itself to operation by heat pumps, thus saving costs for heating. The system according to the invention is also suitable for use together with gas burners, which also operate at low temperature and other similar systems.

A floor heating system comprises several hoses or tubes positioned in the floor structure, or below the floor. Such a floor heating member for each room is controlled by a valve for maintaining the heat medium in the member in accordance with the heat requirements of the room. Often, several valves for several rooms are gathered in a central panel and distribution lines transport heat medium from the valves in the panel to the intended room.

Such floor heating members are often connected in parallel to a circulation pump and a heat source. However, such a parallel system of valves is difficult to control since the adjustment of one valve influences upon the heat transfer in a heating member of an adjacent valve. It is very important to balance the system in advance so that such adjustments are The object of the present invention is to suggest a fluid control system in which such parallel connected valves can be adjusted independent of each other without influencing each other.

DISCLOSURE OF THE INVENTION

Accordingly, there is provided a method of operating a fluid control system, comprising a heat source for a heat medium, several distribution valves for distribution of heat medium to several heat consumers, a feed line for transmitting warm heat medium from the heat source to the distribution valves, distribution lines for transmitting heat medium from the distribution valves to the heat consumers and return lines for transmitting heat medium from the heat consumers back to the heat source. According to the invention, the method comprises the following steps: feeding cold heat medium to each distribution valve in addition to warm heat medium from the heat source; mixing cold and warm heat medium by said distribution valves; feeding said mixed heat medium to said heat consumers; and returning heat medium from the heat consumers to said heat source. The mixing ratio of cold and warm heat medium is controlled in dependence of the heat requirement of the corresponding heat consumer, and the flow to and from each heat consumer is maintained constant independent of said mixing ratio and the heat requirement of the corresponding heat consumer.

According to the invention there is also provided a fluid control system, as defined above, comprising a second feed line for transmitting cod heat medium to each distribution valve in addition to warm heat medium from the heat source; a pump in the return line common to several heat consumers; and a distribution valve, comprising a first adjustment means for adjusting the flow through an output of the valve, and a second adjustment means for adjusting the mixture ratio between cold and warm heat medium, said adjustment means being independent of each other. The first adjustment means comprises an adjustment member for adjustment thereof, which is essentially inaccessible at operation of the system and is adjusted once at the initial set-up of the system, and said second adjustment means comprises an adjustment member which is operated by a temperature control system.

Moreover, there is provided a distribution valve having a first inlet for warm fluid, a second inlet for cold fluid and an outlet for mixed fluid, a first adjustment means for adjusting the mixture ratio between cold and warm fluid, and a second adjustment means for adjusting the total outlet flow out from the valve. The first adjustment means is independent of the second adjustment means so that the mixture ratio between between cold and warm fluid is adjustable independent of the adjustment of the total outlet flow.

SHORT DESCRIPTION OF THE DRAWINGS

The invention is described in more details below by means of preferred embodiments and with reference to the appended drawings, in which.

DETAILED DESCRIPTION OF THE INVENTION

Although this invention will be particularly described in connection with a floor heating system, it is realized that the invention also is applicable at other places, e.g. cooling ceilings, industrial buildings, chemical plants etc.

Moreover, the invention is described using a heat medium, but such a heat medium may also be a cold medium for cooling a ceiling or similar or even other fluids.

Figure 1:
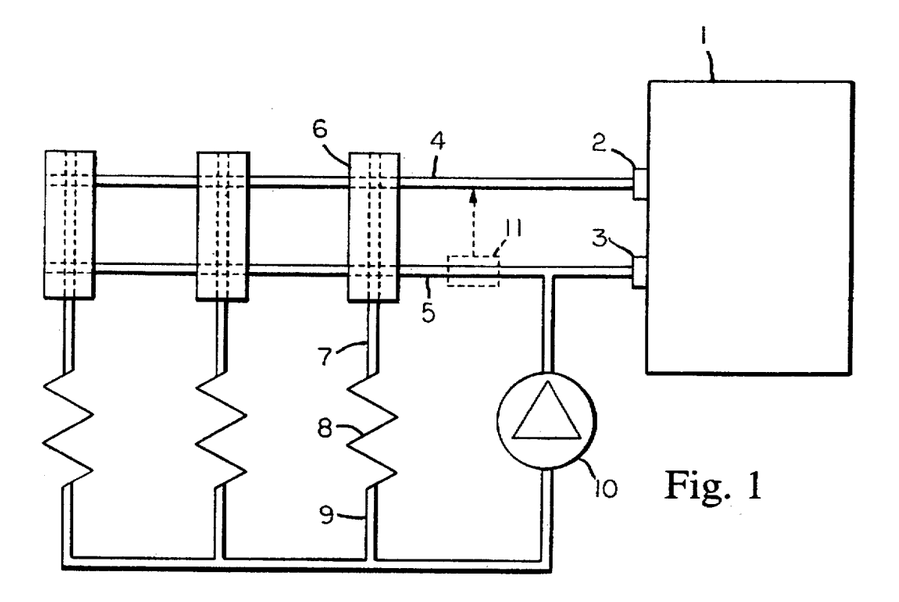
FIG. 1 is a schematic view of a fluid control system used in a floor heating system according to the invention.

The principles of the present invention will be described first with particular reference to FIG. 1, which is a schematic view of a fluid distribution system according to the invention particularly, but not exclusively, for use in a floor heating system.

The system comprises a source 1 for heated fluid, having an outlet connection 2 and a return connection 3. Heated fluid is delivered from outlet connection 2 and cold fluid is returned through return connection 3. A first feed line 4 is connected to the outlet connection 2 for feeding heated fluid and a second feed line 5 is connected to the return connection 3. Several distribution valves 6 are connected in parallel between first and second feed lines 4, 5. To each distribution valve 6, there is connected a distribution line 7 connected to a heat consumer 8, which can be a floor heating member positioned in a room to be heated. The heat consumer 8 is connected to a return line 9 for return via a fluid pump 10 to the return connection 3 of the heat source 1.

Each distribution valve 6 has two adjustment means, one for the total output flow from the distribution valve and one for the mixture ratio between the fluids of the first and second feed lines 4, 5, which controls the temperature of the output flow. According to the invention, the output flow from each distribution valve is adjusted in dependence of the flow requirement for the particular heat consumer 8, and is preferably adjusted at the installation of the system and then fixed. However, the output temperature is adjusted in dependence of the heat requirement of the heat consumer in each moment, by adjustment of the mixture ratio between the fluids in the first and second feed lines 4,5.

Since the output flow to each heat consumer is constant, the return flow through pump 10 is constant and the pump is able to operate at constant flow, which means constant pressure drop over the pump. It is required that the pressure in the first and second feed lines 4,5 are equal and constant. However, the fluid in the first feed line 4 has passed through the heat source 1 and might have a slight pressure drop, which can be compensated by a restriction in the second feed line 5. More preferably, the second feed line 5 is provided with a pressure control valve 11 maintaining the pressure in the second feed line 5 equal to the pressure in the first feed line 4.

It is noted that it is not essential that the pressures in feed lines 4 and 5 are equal, although that is preferred.

The heat consumption in each heat consumer 8 is controlled by the temperature of the heat medium distributed to each heat consumer and such control is independent of the control of an adjacent heat distribution valve, since the output flow from each distribution valve is constant.

The heat source 1 can be operated to produce heated fluid at a predetermined source temperature, and the only requirement is that such source temperature is higher than any temperature required by the heat consumers. For a floor heating system such a source temperature can be as low as 40° C. for allowing use of a heat pump with high efficiency. The source temperature can be adjusted in dependence of the outside temperature to be as low as possible for a given outside temperature or can be constant, e.g. 70° C., for an oil burner.

Figure 2:
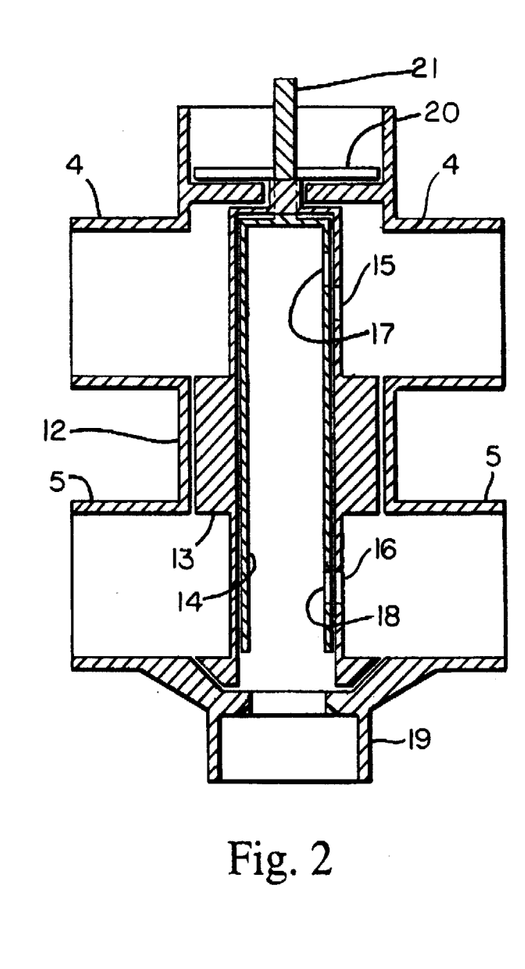
FIG. 2 is a cross-sectional view of a first distribution valve which can be used in the system shown in FIG. 1.

A distribution valve to be used in the above-mentioned system is shown in more details in FIG. 2. It comprises a valve housing 12 interposed in the first and second feed lines 4,5 so that said feed lines passes beyond the valve housing 12 as shown in FIG. 2. The valve housing 12 forms an enlargement of the feed lines.

The valve housing encloses two hollow valve bodies 13,14. The first valve body 13 is rotateable by means of a handle 20 and the second valve body 14 is positioned inside the fast valve body and is axially moveable by means of a shaft 21.

The valve bodies are hollow and the interior thereof is connected to an outlet 19.

The first valve body 13 has a first apertures 15 located in fluid communication with the first feed line 4, and a second apertures 16 located in fluid communication with the second feed line 5. The second valve body 14 has a first apertures 17 located in fluid communication with the first feed line 4, and a second apertures 18 located in fluid communication with the second feed line 5. Said fast apertures 15, 17 and said second apertures 16, 18 can be placed in register with each other by axial movement of the second valve body 14. However, when said first apertures 15, 17 are in register with each other, said second apertures 16, 18 are out of register with each other and vice versa. In the position shown in FIG. 2, apertures 16, 18 are in register with each other and apertures 15, 17 are out of register with each other, allowing cold fluid from the second feed line 5 to enter inside the valve bodies.

All apertures 15, 16, 17, 18 have a rectangular shape. By rotation of the fast valve body 13, the total opening area of the apertures can he adjusted by partly cutting of the apertures 17, 18 in the side direction, i.e. the width of the total opening area is adjusted by the rotation of the first valve body 13. The height of each opening area is adjusted by the axial movement of the second valve body 14, and it is obvious from FIG. 2 that the sum of the height of the two opening areas is constant. Thus, the total output flow through output 19 is adjusted by rotation of the first valve body 13 and the mixture ratio is adjusted by axial movement of the second valve body 14. The two adjustments are independent of each other.

In an actual embodiment of the valve, the apertures are not rectangular, but has a rounded shape in order to obtain a uniform flow through each opening. However, the interaction between the apertures should be as stated above, and the exact shape of the aperture can vary for obtaining the operation described. It is possible to have oval apertures 15, 16 and the adjustment of the outlet flow can be made in steps by having several oval openings 15, 16 around the periphery with different areas (more or less oval), and placing a selected oval opening in register with apertures 17, 18.

Figure 3:
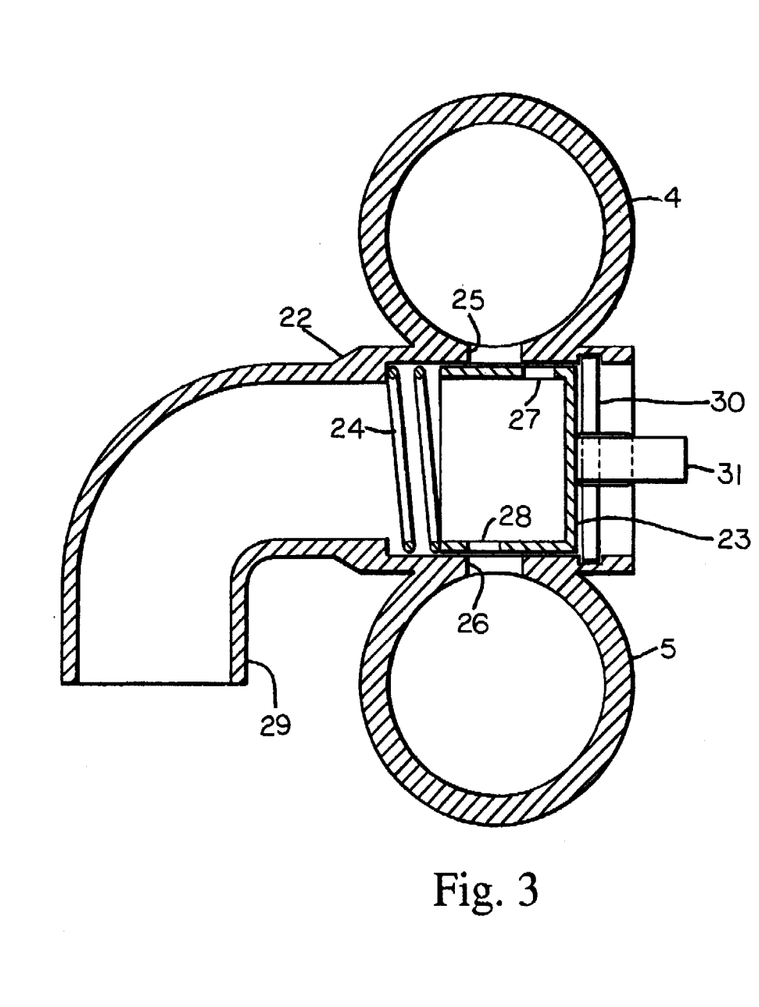
FIG. 3 is a cross-sectional view of a second distribution valve which can be used in the system shown in FIG. 1.

A second embodiment of the distribution valve according to the invention is shown in FIG. 3. The distribution valve comprises a valve housing 22 connected to the first and second feed lines 4, 5 via apertures 25, 26 in the feed lines. The valve encloses a single valve body 23, which is rotateable and axially moveable by handles 30, 31. The valve body 23 is spring loaded to the right in FIG. 3 by a spring 24. The valve body 23 is formed as a cup with the open end facing to the left in FIG. 3 and connected to an outlet 29. The angular position of the valve body 23 is adjusted by a handle 30 which is connected to a sleeve 31 via splines. The sleeve 31 is axially moveable in relation to the handle 30 by operating the outer end of the sleeve 31. The operation is the same as described in connection with FIG. 2.

Figure 4:
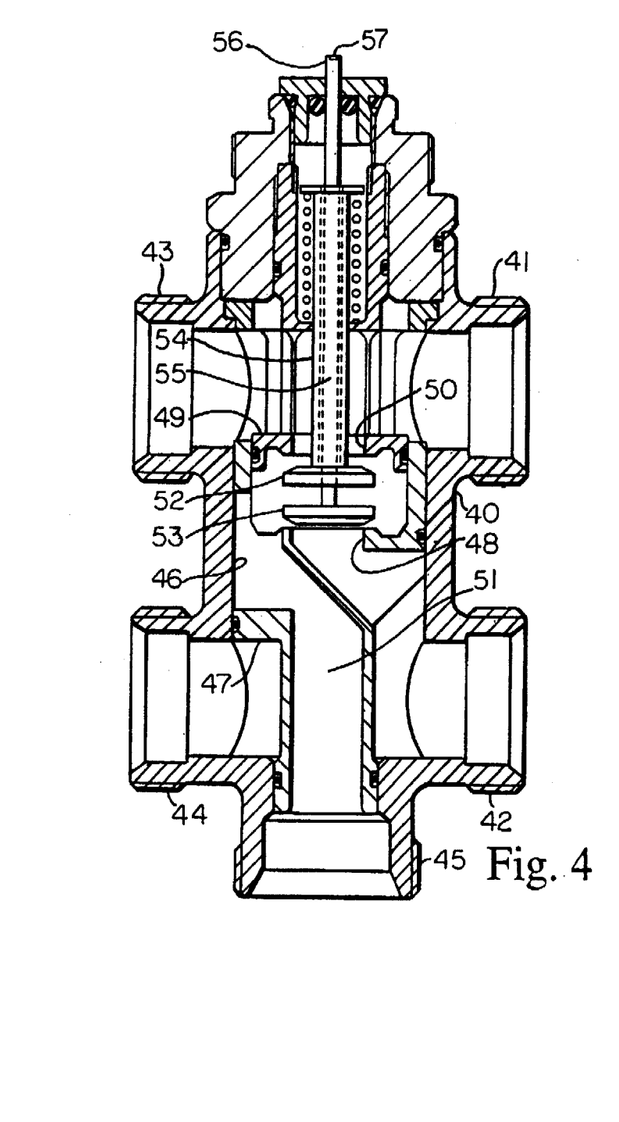
FIG. 4 is a cross-sectional view of a third distribution valve which can be used in the system shown in FIG. 1.

A third embodiment of the distribution valve is shown in FIG. 4. This embodiment is more suited for production by manufacturing the different parts in plastic materials by injection moulding. The distribution valve comprises a valve housing 40 with five connections for fluid and a central hole for insertion of valve members. Each connection is connected to the central hole as appears from FIG. 4. A first connection 41 is connected to the first feed line 4 and a second connection 42 is connected to the second feed line 5. A third connection 43 and a fourth connection 44 connect to an adjacent distribution valve as shown more in details in FIGS. 8 and 9. A fifth connection 45 is an outlet connected to the consumer.

Inserted in the central hole 46 is a first valve member 47 having a valve seat 48 in fluid communication with said second and fourth connections 42 and 44, and a second valve member 49 having a valve seat 50 in fluid communication with said first and third connections 41, 43. The valve seats 48, 50 are positioned opposite each other and spaced apart a predetermined distance from each other and open to a fluid chamber 51 in fluid communication with said outlet connection 45. A valve body is positioned between said valve seats. The valve body is composed of two valve disks 52, 53 each cooperating with a corresponding valve seat 48, 50. Each valve disk is connected to a valve shaft 54, 55 having common symmetry axis. The inner valve shaft 55 has outer screw windings cooperating with inner screw windings of the outer shaft 54, whereby the space between the valve disks 52, 53 can be adjusted. The valve body assembly (valve disks 52, 53: and shafts 54, 55) is displaceable in the axial direction by a shaft end 56 extending outside the valve housing, being the end of the inner shaft. The shaft end 56 is actuable by a tool connection 57.

The operation of the valve according to FIG. 4 is as follows. The distance between the valve disks 52, 53 is adjusted by the tool connection 57 so that it is slightly less than the space between the valve seats 48, 50. This adjustment determines the total fluid flow through the valve. By adjustment of the axial position of the valve assembly 52, 53, 54, 55, the mixture ratio between the fluid at the inlet connections 41, 42 is determined and thus the temperature of the output flow.

Figure 5:
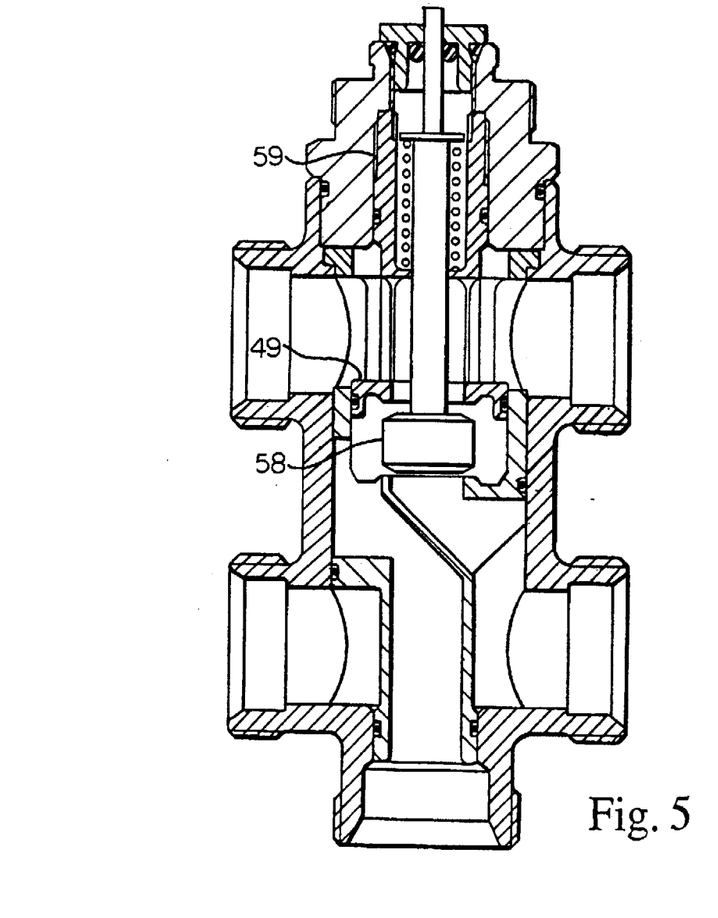
FIG. 5 is a cross-sectional view of a forth distribution valve which can be used in the system shown in FIG. 1.

A alternative embodiment of the valve according to FIG. 4 is shown in FIG. 5. The difference it that the valve disks 52, 53 are replaced by a single valve disk 58 and the distance between the valve seats 48, 50 is adjustable by vertical adjustment of the second valve member 49 via screw windings 59.

Figure 6:
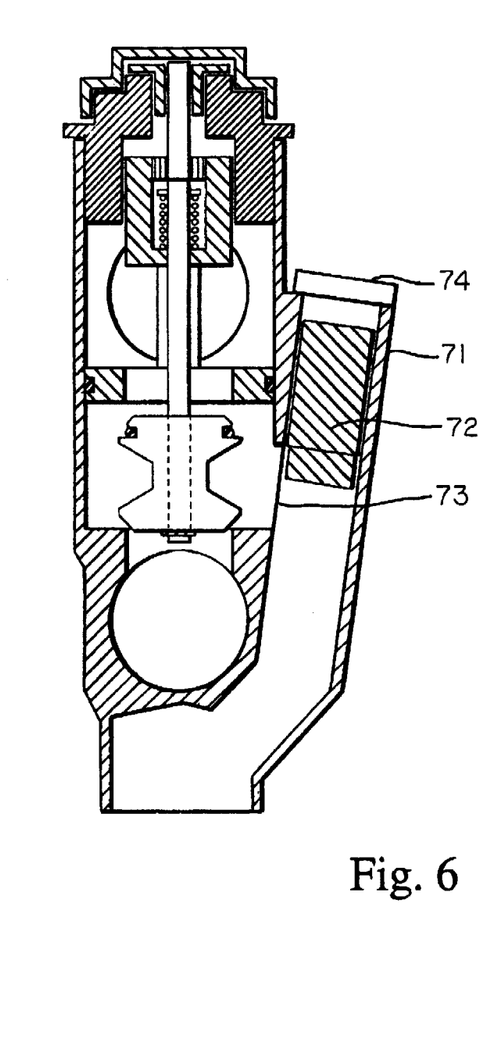
FIGS. 6 and 7 are cross-sectional views of a fifth distribution valve which can be used in the system shown in FIG. 1.
Figure 7:
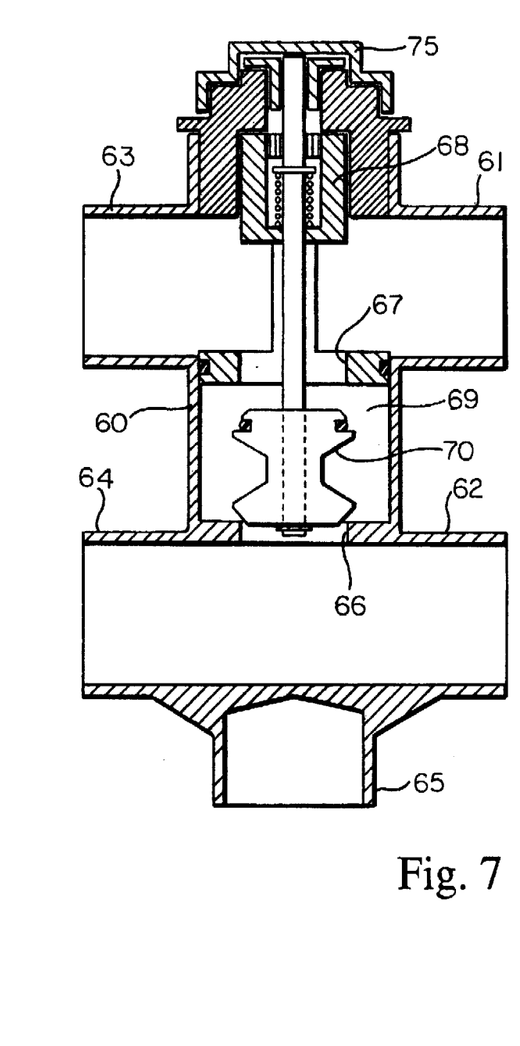

A fifth embodiment of the distribution valve according to the invention is shown in FIGS. 6 and 7. In FIG. 7 a cross-sectional view similar to FIGS. 4 and 5 is shown. The valve comprises a valve housing 60 and connections 61, 62, 63 and 64 similar to connections 41, 42, 43 and 44 in FIG. 4. An outlet connection 65 is different compared to FIG. 4. A first valve seat 66 is formed in the valve housing in fluid communication with connections 62 and 64 and a second valve seat 67 is formed in a valve member 68 inserted in the valve housing. The valve seats 66 and 67 are faced towards each other and spaced a certain distance and opens to a valve chamber 69. Between the valve seats 66 and 67 and inside said valve chamber 69 is positioned a valve body 70 having a width slightly smaller than the distance between the valve seats.

As appears from FIG. 6, the valve chamber 69 is connected to the outlet 65 via a throttle valve 71 having a valve member 72 which partly closes an opening 73.

The operation of the valve according to FIGS. 6 and 7 is evident from the above description and the drawing. The total flow is adjusted by a handle 74 of throttle valve 71 and the mixture ratio and thus the temperature is adjusted by axial movement of the valve body 70 via a handle 75.

Figure 8:
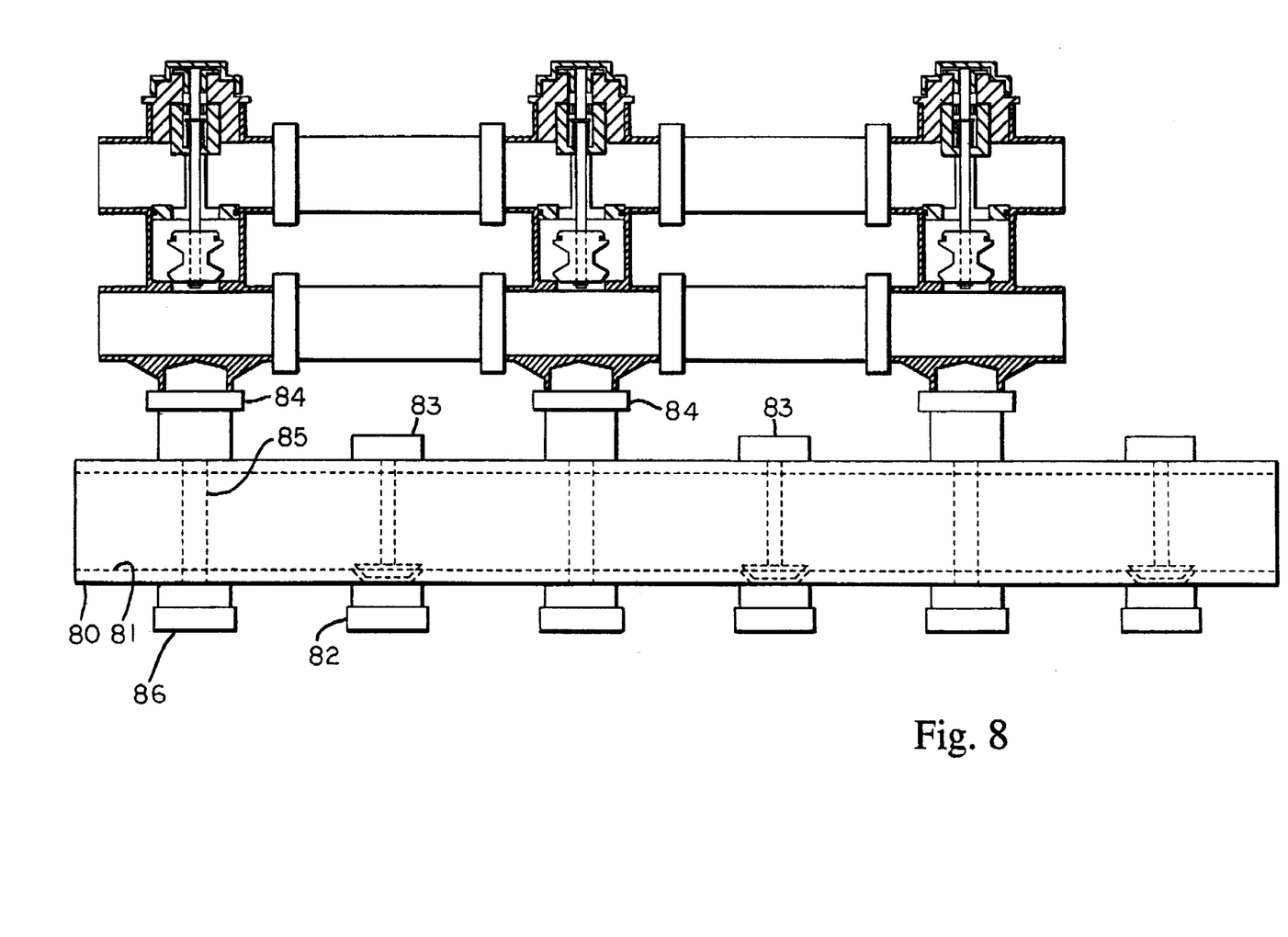
FIG. 8 is a partly cross-sectional view of distribution valves according to FIGS. 6 and 7 mounted in a line.
Figure 9:
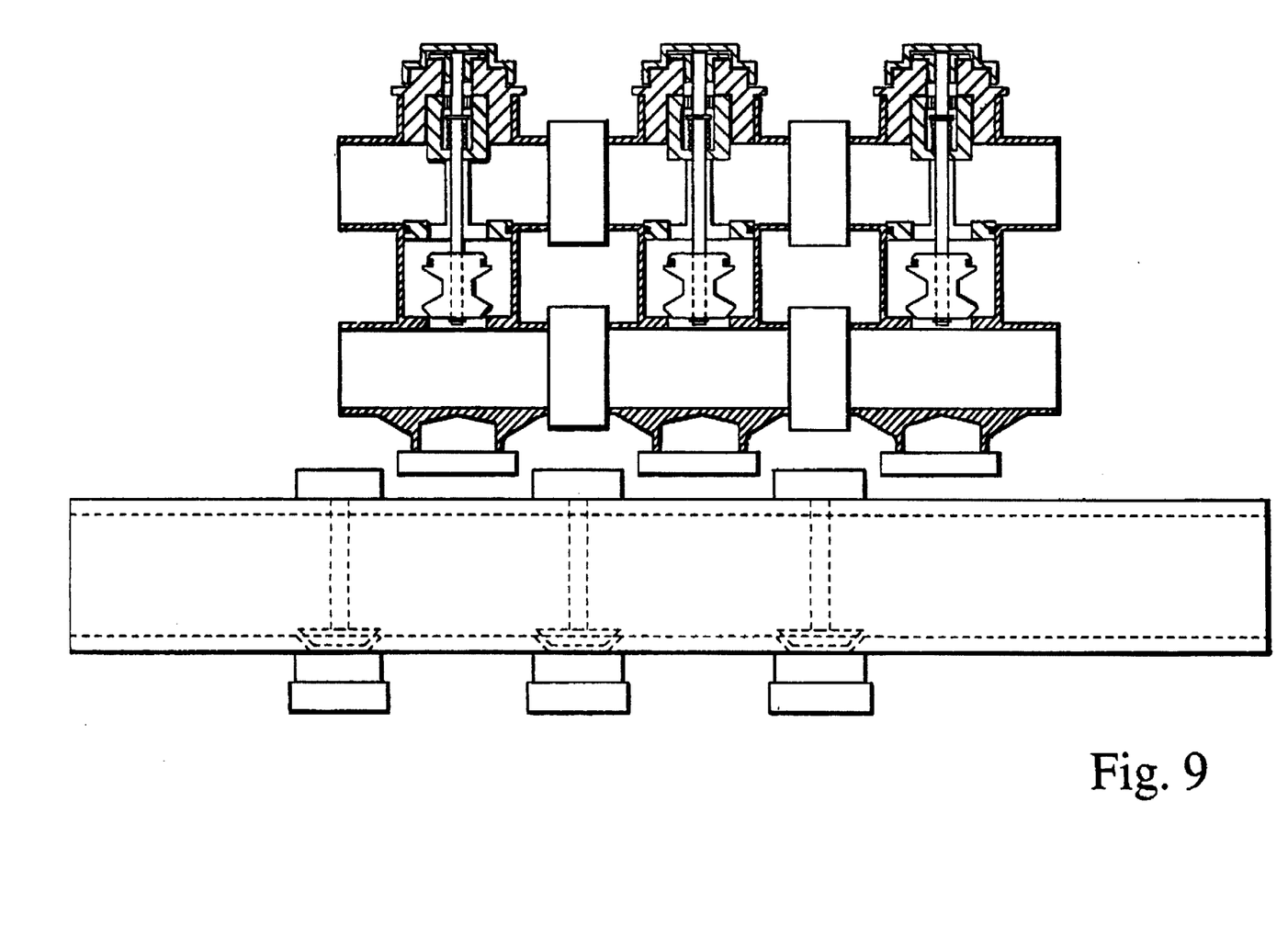
FIG. 9 is a partly cross-sectional view of distribution valves according to FIGS. 6 and 7 mounted in a line and more close than in FIG. 8.

The valve according to FIGS. 6 and 7 can be mounted as shown in more details in FIGS. 8 and 9. A panel 80 comprises an interior channel 81 which is connected to return lines 9 from several heat consumers 8 via connections 82, c.f. also FIG. 1. Each connection can be operated by a throttle valve 83 for interrupting flow from a separate heat consumer. One end of channel 81 is connected to the pump 10 as shown in FIG. 1.

A distribution valve according to FIGS. 6 and 7 is associated with each return connection 82 and is mounted in fittings 84. The fitting 84 is an alternative for the throttling valve 83 and is inserted through the same hole in the panel 80. The fitting comprises a tube 85 connecting the outlet of the valve with the corresponding connection 86. Thus, a heat consumer is connected between a connection 86 and a connection 82. The valves are interconnected by several tubes as shown in FIG. 8.

A more condensed mounting is shown in FIG. 9, in which the separate valves are directly screwed to each other and are placed beside the panel as clearly shown in FIG. 9.

The invention is developed for a floor heating system. However, a floor heating system sometimes involves combination with a conventional radiator system. Such a combination can be used in two-flat houses, whereby the lower flat is heated by a floor heating system while the second floor is heated by a conventional radiator system. The different heating systems require very different temperatures of the heating fluid, while the floor heating system is a low temperature system and the radiator system uses higher temperatures.

Figure 10:
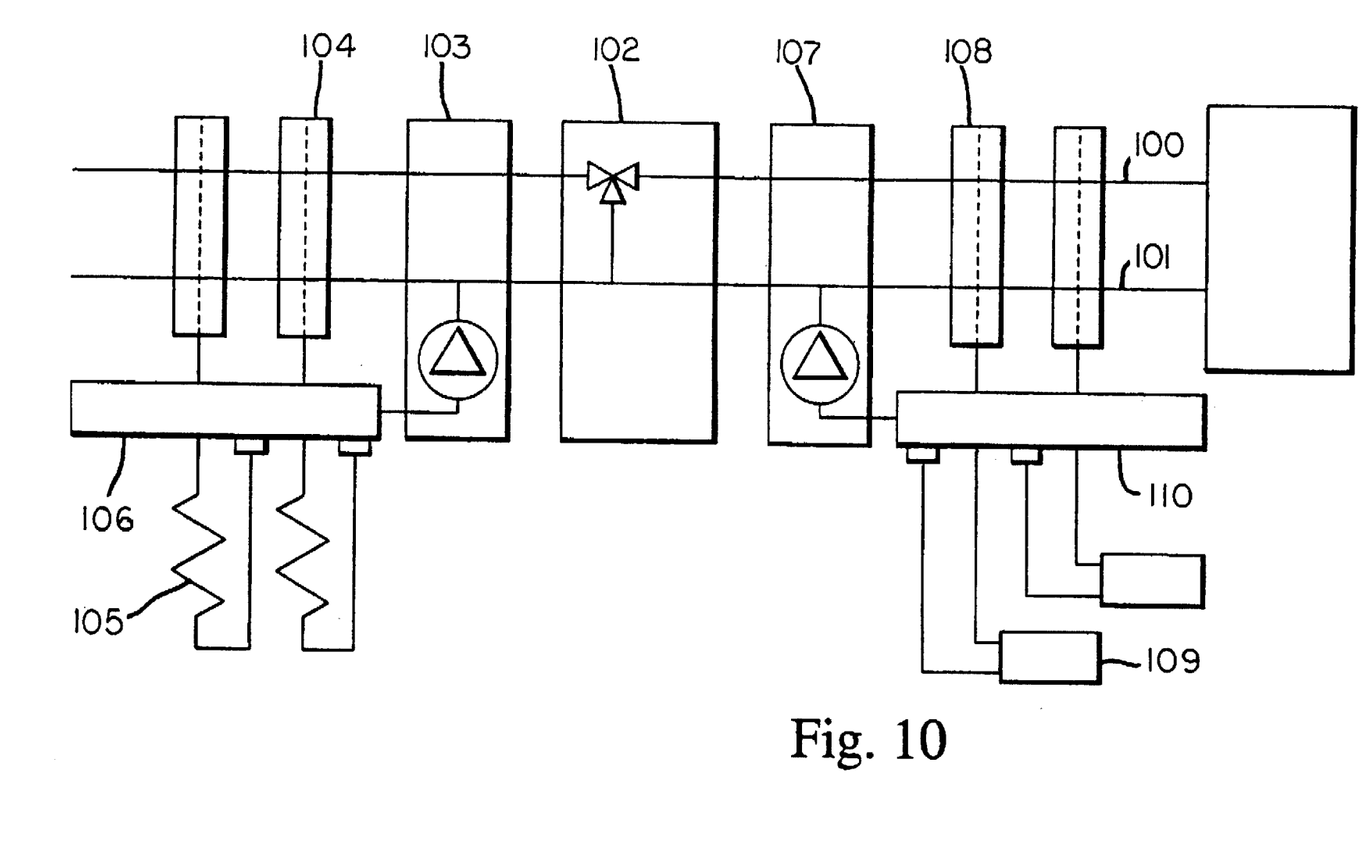
FIG. 10 is a schematic view and shows a dual temperature system according to the invention.

FIG. 10 shows a combination of a floor heating system with a lower temperature of the heating medium of e.g. 50° C. and a radiator system with a higher temperature of the heating medium of e.g. 90° C. The system comprises a heat source (not shown) comprising a tint feed line 100 for a fluid of e.g. 90° C. and a return line 101 for cold fluid. A distributor block 102 is mounted in a heat central and comprises a thermo-static mixing valve for mixing warm fluid with cold fluid for obtaining a temperature of e.g. 50° C. To the left of the distributor block 102 is mounted a first pump block 103 and several distributor valves 104, only one of which is shown in FIG. 10. Each distributor valve 104 is connected to a floor heating hose 105, the return line of which is connected to a panel 106. To the right of the distributor block is mounted a second pump block 107 and several distributor valves 108, only one of which is shown in FIG. 10. Each distributor valve 108 is connected to a radiator member 109, the return line of which is connected to a panel 110.

Thus, it is obvious that a common distributor central can he provided and the requirements of each system can be obtained.

Figure 11:
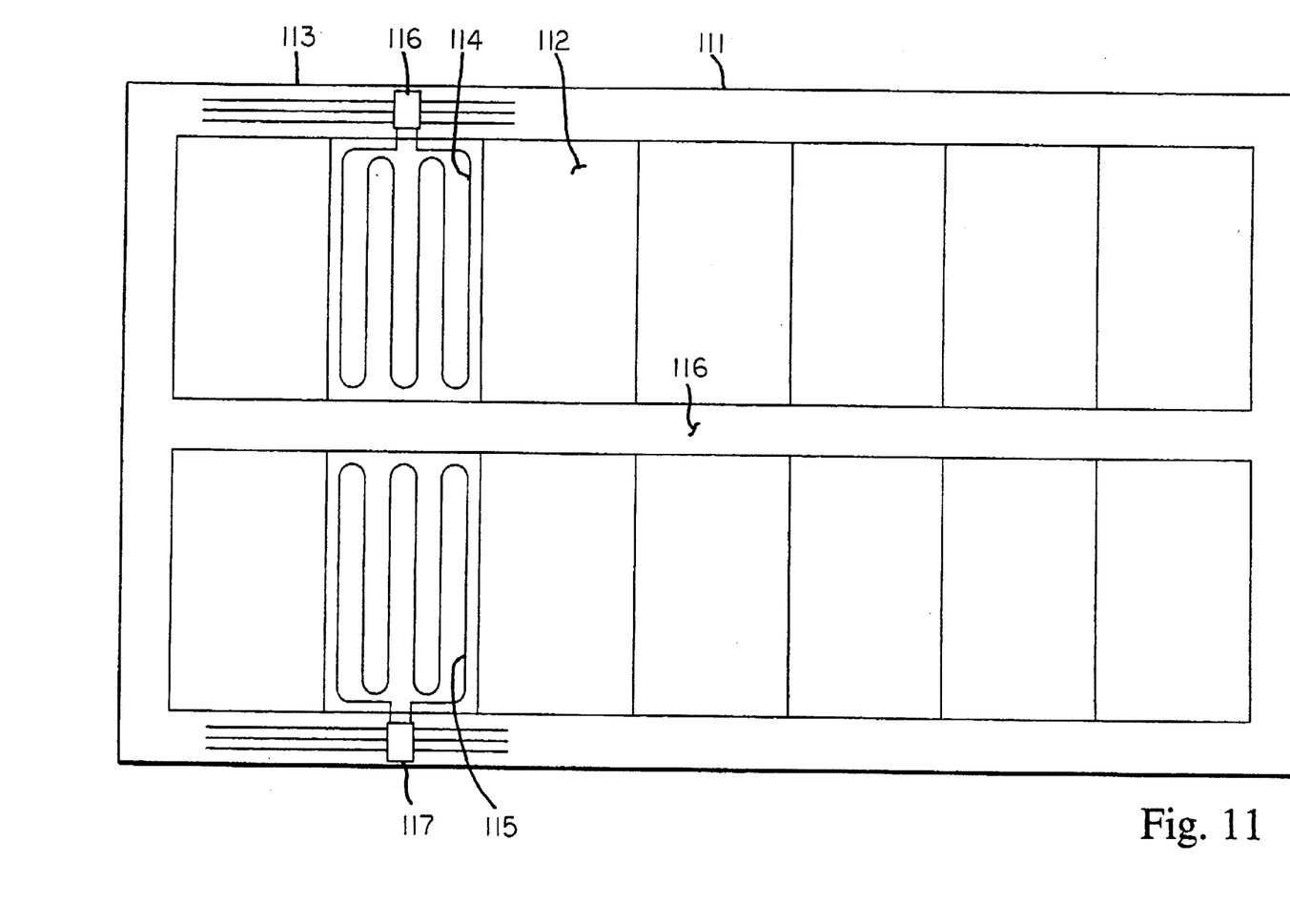
FIG. 11 is a schematic diagram of a decentralized positioning of the distribution valve according to the invention.

In FIG. 11 another important aspect of the present invention is shown. FIG. 11 shows a plan 111 of a house having several rooms 112 in a row, whereby two rows each having seven rooms are shown in FIG. 11. Each room is heated by a separate floor heating member 114, 115 and the lines for connecting such members 114, 115 are enclosed in a channel 113 extending around the border of the house. Alternatively or in addition, a central channel 116 can be provided. It is realized that said channel must enclose two separate lines for each heating member and thus 28 lines would be necessary for the installation according to the figure. By the distribution system according to the invention it is possible to reduce the number of lines required to three, which is a considerable saving, both in place, cost and complexity. The solution is to have a distribution valve at each connection of a floor heating member 114, 115 as shown at 116 and 117. It is only necessary to have one feed line for heated fluid, one line for cold fluid and one return line to the pump for all rooms. The mixture temperature, i.e. the ratio between the heated fluid and the cold fluid is adjusted by a temperature regulation system, which can be electronically, electro-mechanically, hydraulically controlled or any similar control system. The control is obvious to a skilled person.

It is obvious that the distribution valves are controlled in the same manner either if they are placed in a common central location or at the site close to the rooms. One popular solution is to have a temperature sensitive switch at each room, which controls an electric motor or solenoid which is allowed to act directly on the control subject, i.e. shaft 21 in FIG. 2 etc. It is easy to transmit the electric signal from such a switch to any convenient location of the valve. Another more sophisticated solution is to use temperature sensitive resisters in each room, which are monitored by a digital computer which provides control signals to an electric motor or solenoid for operation of the corresponding valve in dependence of any computer program. Such a computer can at the at the same time control the heat source 1, especially if it is a heat pump, in dependence of the outdoor temperature.

Further modifications occur to a skilled person reading this specification and the intent is that such modifications obvious to a skilled person should be encompassed within the scope of the invention. The invention is only limited by the appended patent claims.

What is claimed is:

1. A heating system comprising a heat source for heating a fluid for circulation in a closed heating circuit including a plurality of heat consumers, said heating circuit comprising:

a first feed line connected to said heat source for supplying heated fluid from said heat source to a plurality of distribution valves;

a plurality of heat consumers connected in parallel to said closed heating circuit so as to receive heated fluid from said first feed line via respective distribution valves;

a return line for each of said heat consumers for passing said fluid from each heat consumer to a common return line, a common pump in said common return line, said common return line after said pump communicating with return line means for returning a portion of said fluid from said common return line to said heat source and with a second feed line communicating with each of said distribution valves for returning another portion of said fluid from said common return line to said distribution valves;

a first adjustment means for initially setting a constant output flow from each distribution valve to the corresponding heat consumer at the initial set-up of the system;

and a second adjustment means for controlling a mixing ratio of fluid supplied by the first and second feed lines at said constant output flow.

2. A heating system according to claim 1, wherein said first adjustment means comprises an adjustment member (20) which is essentially inaccessible during operation of the system and is adjusted once at the initial set-up of the system, and wherein said second adjustment means comprises an adjustment member which is operated by a temperature control system.

3. A heating system according to claim 1, wherein the heat consumer is a floor heating member.

* * * * *